United States Patent
Abe et al.

(10) Patent No.: US 10,018,359 B2
(45) Date of Patent: Jul. 10, 2018

(54) GAS TURBINE COMBUSTOR

(71) Applicant: Mitsubishi Hitachi Power Systems, Ltd., Nishi-ku, Yokohama (JP)

(72) Inventors: Kazuki Abe, Yokohama (JP); Tomomi Koganezawa, Yokohama (JP); Keisuke Miura, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 293 days.

(21) Appl. No.: 14/778,031

(22) PCT Filed: Nov. 5, 2013

(86) PCT No.: PCT/JP2013/079943
§ 371 (c)(1),
(2) Date: Sep. 17, 2015

(87) PCT Pub. No.: WO2015/068212
PCT Pub. Date: May 14, 2015

(65) Prior Publication Data
US 2016/0290646 A1  Oct. 6, 2016

(51) Int. Cl.
*F23R 3/28* (2006.01)
*F23R 3/04* (2006.01)
(Continued)

(52) U.S. Cl.
CPC .................. *F23R 3/04* (2013.01); *F02C 3/04* (2013.01); *F23R 3/12* (2013.01); *F23R 3/28* (2013.01);
(Continued)

(58) Field of Classification Search
CPC ...... F23R 3/04; F23R 3/10; F23R 3/12; F23R 3/28; F23R 3/286; F23R 3/50; F23R 3/60
See application file for complete search history.

(56) References Cited

U.S. PATENT DOCUMENTS

2004/0000146 A1\* 1/2004 Inoue ................... F02C 7/22
60/776
2008/0096146 A1\* 4/2008 Li ........................ F23C 6/045
431/9
(Continued)

FOREIGN PATENT DOCUMENTS

EP         2 415 993 A2    2/2012
JP         2009-14324 A    1/2009
(Continued)

OTHER PUBLICATIONS

International Search Report (PCT/ISA/210) dated Dec. 3, 2013, with English translation (Two (2) pages).
(Continued)

*Primary Examiner* — Steven Sutherland
(74) *Attorney, Agent, or Firm* — Crowell & Moring LLP

(57) ABSTRACT

A gas turbine combustor 2 according to the present invention comprises: a combustion chamber 50 in which fuel is burned with air to generate combustion gas; a plurality of fuel nozzles 30 arranged in multiple concentric annular rows; a first plate 32 arranged downstream of the fuel nozzles 30 and having multiple concentric circular air hole rows made up of a plurality of air holes corresponding to the fuel nozzles 30; a second plate 33 arranged downstream of the first plate 32 and having multiple air hole rows corresponding to the air hole rows of the first plate 32; and a partition wall part 37 which partitions a space part 46 between the first plate 32 and the second plate 33 into rooms corresponding to the air hole rows.

8 Claims, 15 Drawing Sheets

(51) Int. Cl.
  *F23R 3/12* (2006.01)
  *F02C 3/04* (2006.01)
  *F23R 3/50* (2006.01)
  *F23R 3/60* (2006.01)

(52) U.S. Cl.
  CPC .............. *F23R 3/286* (2013.01); *F23R 3/50* (2013.01); *F23R 3/60* (2013.01); *F23R 2900/00016* (2013.01); *F23R 2900/03042* (2013.01); *F23R 2900/03043* (2013.01)

(56) References Cited

U.S. PATENT DOCUMENTS

| | | | | |
|---|---|---|---|---|
| 2008/0268387 | A1* | 10/2008 | Saito | F23R 3/286 431/8 |
| 2009/0031728 | A1* | 2/2009 | Miura | F23D 14/64 60/737 |
| 2009/0173075 | A1* | 7/2009 | Miura | F23R 3/10 60/737 |
| 2009/0293484 | A1* | 12/2009 | Inoue | F23R 3/286 60/740 |
| 2010/0236247 | A1 | 9/2010 | Davis, Jr. et al. | |
| 2010/0251725 | A1* | 10/2010 | Dodo | F23R 3/286 60/772 |
| 2011/0076628 | A1* | 3/2011 | Miura | F23R 3/10 431/12 |
| 2012/0031103 | A1* | 2/2012 | Abe | F02C 6/18 60/776 |

FOREIGN PATENT DOCUMENTS

| | | |
|---|---|---|
| JP | 2009-74706 A | 4/2009 |
| JP | 2010-216799 A | 9/2010 |
| JP | 2011-191046 A | 9/2011 |
| JP | 4922878 B2 | 4/2012 |

OTHER PUBLICATIONS

Preliminary Report on Patentability (PCT/ISA 373) and Written Opinion (PCT/ISA/237) issued in PCT Application No. PCT/JP2013/079943 dated May 19, 2016 (5 pages).

Extended European Search Report issued in counterpart European Application No. 13896977.9 dated Jun. 14, 2017 (8 pages).

* cited by examiner

GAS TURBINE COMBUSTOR

TECHNICAL FIELD

The present invention relates to a gas turbine combustor.

BACKGROUND ART

In recent years, further efficiency improvement and NOx reduction are being required of a gas turbine comprising a compressor, a combustor, a turbine, etc. by the regulations and social demands for environmental conservation. As a method for the efficiency improvement, in this type of gas turbines adopted is a method of increasing the temperature of the combustion gas existing from the combustor to the inlet of the turbine. However, there is a possibility that the amount of NOx emission increases with the increase in the temperature of the flame formed in the combustor.

Combustors designed to reduce the NOx emission include those employing premix combustion. The premix combustion is a combustion method in which air-fuel mixture obtained by previously mixing fuel and air together (premixed gas) is supplied to the combustor and brought into combustion. A combustor of this type comprises a burner having a premixer and a combustion chamber arranged downstream of the burner in the flow direction of the air-fuel mixture. The premixer is a device for generating the air-fuel mixture. The air-fuel mixture is supplied from the premixer to the combustion chamber and combusts in the combustion chamber. In the premix combustion, the fuel and air are previously mixed together and supplied to the combustion chamber, by which the temperature of the flame formed in the combustion chamber is uniformized and the NOx emission from the combustor is reduced. However, if the air temperature or the hydrogen content in the fuel increases, the combustion speed increases and the possibility of the so-called "flashback" (the flame formed in the combustion chamber flowing back to the premixer and so forth) arises. In consideration of the above-described situation, there has been proposed a combustor excelling in flashback resistance while also reducing the NOx emission (see Patent Literature 1, for example).

PRIOR ART LITERATURE

Patent Literature

Patent Literature 1: Japanese Patent No. 4922878

SUMMARY OF THE INVENTION

Problem to be Solved by the Invention

Patent Literature 1 discloses a configuration in which an air hole plate, including a first perforated plate formed with a plurality of first air holes and a second perforated plate formed with a plurality of second air holes, is arranged downstream of a plurality of fuel nozzles. The air-fuel mixture ejected from the first air holes is made to collide with the second perforated plate and is ejected into the combustion chamber through the second air holes. However, in cases where the fuel is injected from part of the fuel nozzles for partial load operation, air is ejected also from first air holes to which no fuel is supplied. Accordingly, the air-fuel mixture ejected from part of the first air holes is diluted in the space between the first and second perforated plates by the air ejected from the other first air holes and the fuel-air ratio of the air-fuel mixture ejected into the combustion chamber through the second air holes can become excessively low. If the fuel-air ratio of the air-fuel mixture flowing into the second air holes cannot be precisely controlled as in this case, it is difficult to maintain stable combustion in a series of operation steps from the ignition of the gas turbine to the full load operation.

The object of the present invention, which has been made in consideration of the above-described situation, is to provide a combustor capable of precisely controlling the fuel-air ratio in each air hole and thereby achieving stable combustion in a series of operation steps from the ignition of the gas turbine to the full load operation while also reducing the NOx emission.

Means for Solving the Problem

To achieve the above object, a gas turbine combustor in accordance with an aspect of the present invention comprises: a combustion chamber in which fuel is burned with air to generate combustion gas; a plurality of fuel nozzles arranged in multiple concentric annular rows; a first plate arranged downstream of the fuel nozzles and having multiple concentric circular air hole rows made up of a plurality of air holes corresponding to the fuel nozzles; a second plate arranged downstream of the first plate and having multiple air hole rows corresponding to the air hole rows of the first plate; and a partition wall part which partitions a space part between the first plate and the second plate into rooms corresponding to the air hole rows.

Effect of the Invention

According to the present invention, it becomes possible to provide a combustor capable of precisely controlling the fuel-air ratio in each air hole and thereby achieving stable combustion in a series of operation steps from the ignition of the gas turbine to the full load operation while also reducing the NOx emission.

MODES FOR CARRYING OUT THE INVENTION

First Embodiment (Configuration)
1. Gas Turbine Plant

First, a gas turbine plant comprising a gas turbine combustor according to this embodiment will be described below with reference to figures.

Figure 1:
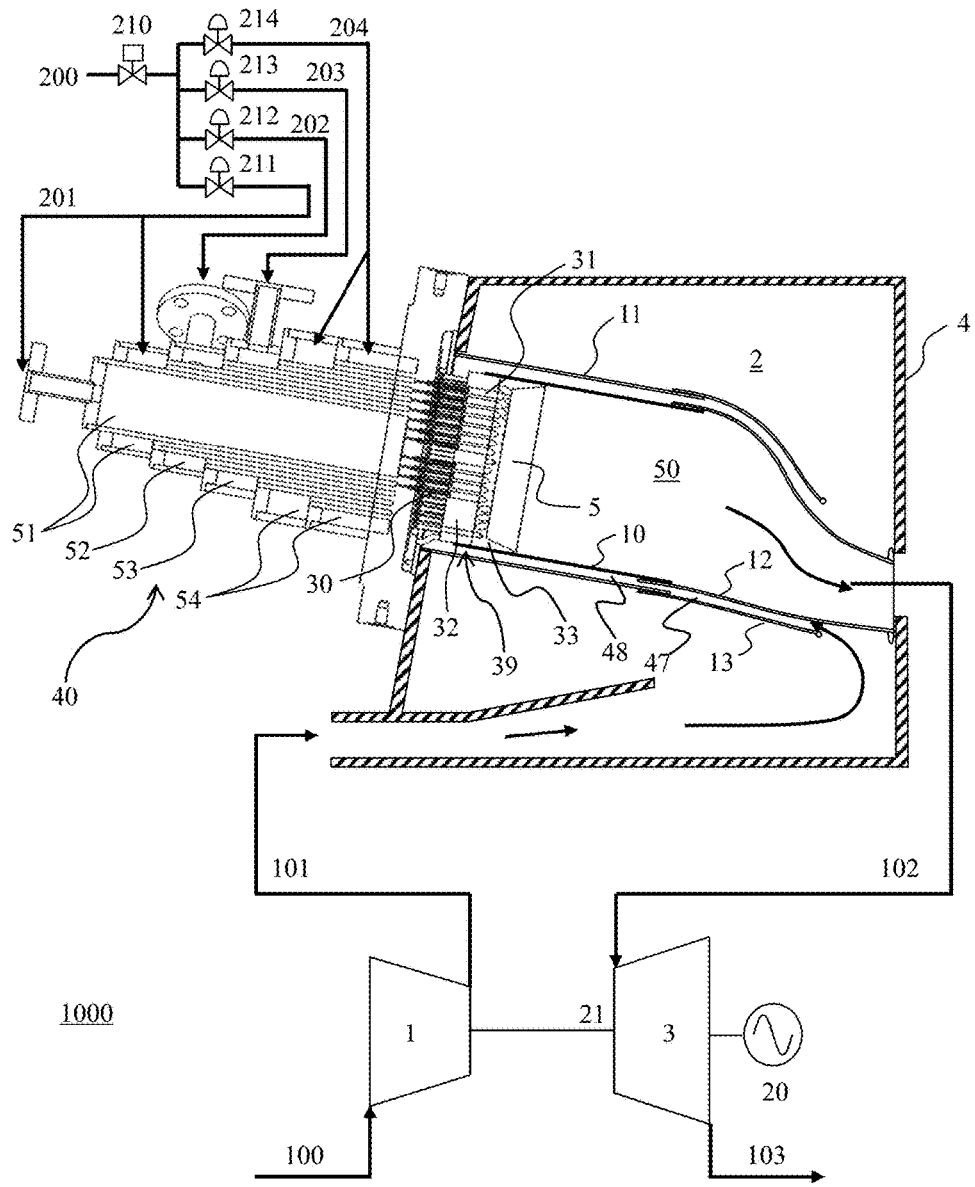
FIG. 1 is a schematic diagram showing the overall configuration of a gas turbine plant comprising a gas turbine combustor in accordance with a first embodiment of the present invention.

FIG. 1 is a schematic diagram showing the overall configuration of a power generation gas turbine plant 1000 comprising the gas turbine combustor 2 according to this embodiment. As shown in FIG. 1, the gas turbine plant 1000 comprises a gas turbine and a generator 20. The gas turbine includes a compressor 1, a gas turbine combustor 2 and a turbine 3.

The compressor 1 compresses intake air 100 taken in through an intake part (unshown), thereby generates high-pressure air 101, and supplies the high-pressure air 101 to the gas turbine combustor 2. The gas turbine combustor 2 mixes the high-pressure air 101 supplied from the compressor 1 with the fuel supplied through a fuel system 200 (explained later), combusts the air-fuel mixture, thereby generates high-temperature combustion gas 102, and supplies the high-temperature combustion gas 102 to the turbine 3. The turbine 3 is driven by the expansion of the combustion gas 102 supplied from the gas turbine combustor 2. The generator 20 is rotated by the drive force obtained by the turbine 3 and generates electric power. In this embodiment, the compressor 1, the turbine 3 and the generator 20 are linked together by an integral shaft 21. The drive force obtained by the driving of the turbine 3 is transmitted to the compressor 1 and the generator 20 via the shaft 21.

2. Gas Turbine Combustor

The gas turbine combustor 2 comprises a burner 5, a combustor liner 10, a flow sleeve 11, an inner tail tube 12, an outer tail tube 13, fuel systems 201-204, and a header 40. The gas turbine combustor 2 is stored in the casing 4 of a gas turbine unit. The burner 5 is arranged in the gas turbine combustor 2. The combustor liner 10, formed in a cylindrical shape for separating the combustion gas 102 generated by the gas turbine combustor 2 from the high-pressure air 101 supplied from the compressor 1, is arranged inside the gas turbine combustor 2 and downstream of the burner 5 in the flow direction of the combustion gas 102.

Arranged outside the combustor liner 10 is the flow sleeve 11 which is formed in a cylindrical shape to cover the combustor liner 10. An annular space formed between the combustor liner 10 and the flow sleeve 11 constitutes a channel 48 through which the high-pressure air 101 supplied from the compressor 1 to the gas turbine combustor 2 flows.

In the combustion chamber 50 formed inside the combustor liner 10, the air-fuel mixture of the high-pressure air 101 ejected from the burner 5 and the fuel supplied through the fuel system 200 is combusted. One end of the combustor liner 10 farther from the burner 5 (downstream end in the flow direction of the combustion gas 102) is inserted into one end of the inner tail tube 12. The inner tail tube 12 is a tube for leading the combustion gas 102 generated in the combustion chamber 50 to the turbine 3. The other end of the inner tail tube 12 is connected to a line connecting the gas turbine combustor 2 and the turbine 3 together. Arranged outside the inner tail tube 12 is the outer tail tube 13 which is formed in a cylindrical shape to cover the inner tail tube 12. One end of the flow sleeve 11 farther from the burner 5 (downstream end in the flow direction of the combustion gas 102) is inserted into one end of the outer tail tube 13. The outer tail tube 13 forms an annular space between itself and the inner tail tube 12. The other end of the outer tail tube 13 is open to the inside of the casing 4. The space between the inner tail tube 12 and the outer tail tube 13 constitutes a channel 47 for the high-pressure air 101 flowing in from the other end of the outer tail tube 13.

The high-pressure air 101 flowing into the channel 47 formed between the inner tail tube 12 and the outer tail tube 13 cools down the inner tail tube 12 from its outer surface by means of convection cooling. Further, the high-pressure air 101 flowing into the annular channel 48 formed between the flow sleeve 11 and the combustor liner 10 after flowing through the channel 47 is used for convection cooling of the combustor liner 10 arranged in the gas turbine combustor 2.

Part of the high-pressure air 101 flowing through the annular channel 48 formed between the flow sleeve 11 and the combustor liner 10 flows into the inside of the combustor liner 10 via a lot of cooling holes (unshown) formed through the wall of the combustor liner 10 and is used for the film cooling of the combustor liner 10. The remaining high-pressure air 101 that was not used for the film cooling of the combustor liner 10 flows through the annular channel 48 and is supplied to the inside of the combustor liner 10 as combustion air via a great number of air holes 31 of the burner 5 provided for the gas turbine combustor 2. Then, via the great number of air holes 31, the combustion air is ejected from the burner 5 of the gas turbine combustor 2.

The burner 5 is supplied with the fuel from four fuel systems 201-204 (F1-F4 fuel systems). The F1-F4 fuel systems 201-204 are provided with F1-F4 fuel flow control valves 211-214, respectively. In this embodiment, the fuel systems 201-204 branch out from the fuel system 200 having a fuel shut-off valve (switching valve) 210. Incidentally, the number of fuel systems branching out from the fuel system 200 is not limited to four.

The fuel flowing through the fuel systems 201-204 is supplied to the header 40 which is partitioned into multiple rooms differing in the radial direction distance from the central axis of the combustor liner 10. In this embodiment, the header 40 is partitioned into a first header 51, a second header 52, a third header 53 and a fourth header 54. The F1 fuel system 201, the F2 fuel system 202, the F3 fuel system 203 and the F4 fuel system 204 are connected to the first header 51, the second header 52, the third header 53 and the fourth header 54, respectively. The fuel supplied to the header 40 via each fuel system is injected from tip ends of fuel nozzles 30 supported by the header 40 and supplied to the burner 5. Incidentally, the number of partitioned spaces (rooms) in the header 40 is not limited to four.

The flow rate of F1 fuel supplied to the burner 5 through the F1 fuel system 201 is regulated by the F1 fuel flow control valve 211. The flow rate of F2 fuel supplied to the burner 5 through the F2 fuel system 202 is regulated by the F2 fuel flow control valve 212. The flow rate of F3 fuel supplied to the burner 5 through the F3 fuel system 203 is regulated by the F3 fuel flow control valve 213. The flow rate of F4 fuel supplied to the burner 5 through the F4 fuel system 204 is regulated by the F4 fuel flow control valve 214. In this embodiment, the amount of power generation by the gas turbine plant 1000 is controlled by regulating the flow rates of the F1 fuel, the F2 fuel, the F3 fuel and the F4 fuel with the fuel flow control valves 211, 212, 213 and 214, respectively.

3. Burner

Figure 2:
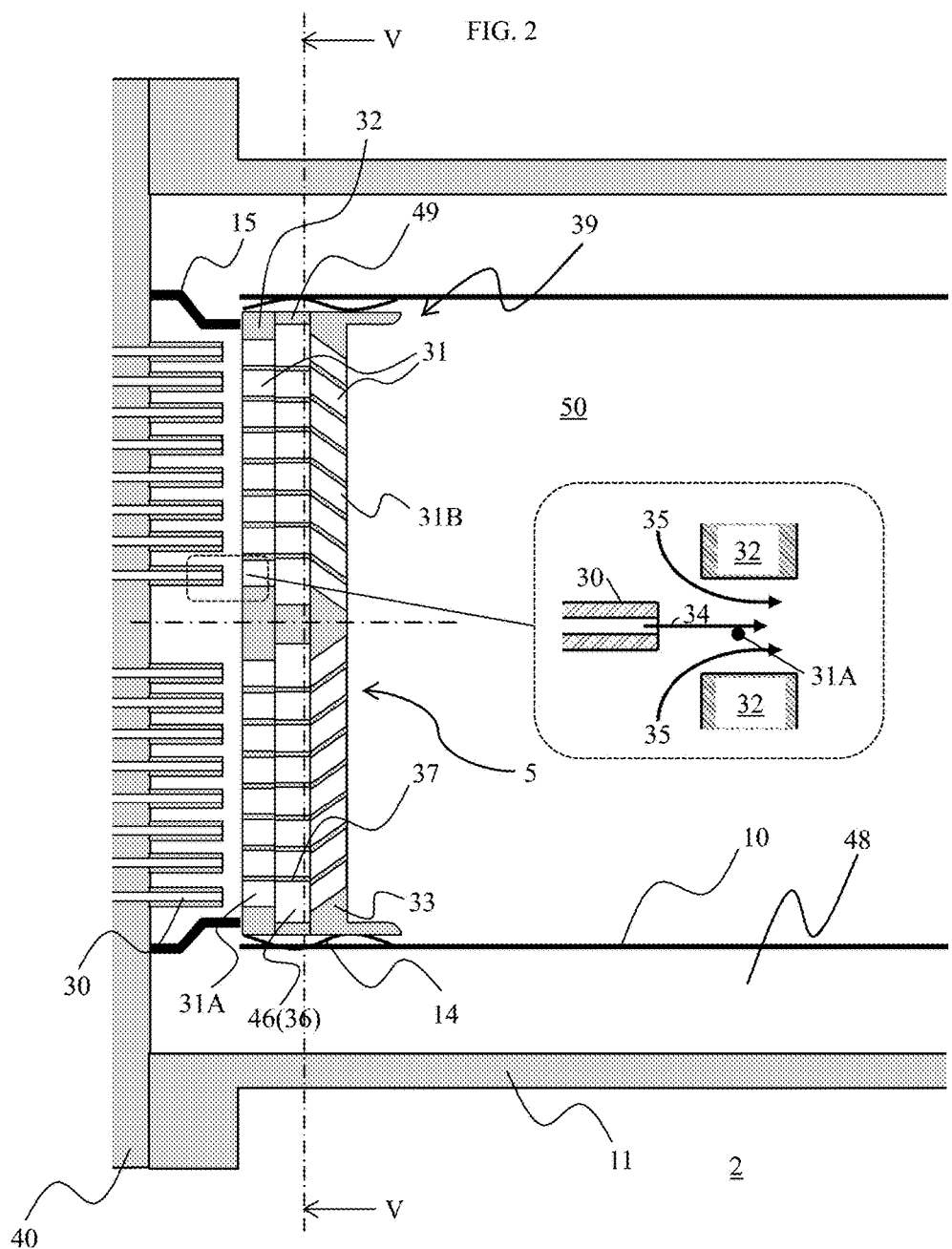
FIG. 2 is a partial structural drawing showing the structure around a burner of the gas turbine combustor in accordance with the first embodiment of the present invention.

Next, the detailed configuration of the burner 5 will be explained. FIG. 2 is a partial structural drawing showing the structure around the burner 5 of the gas turbine combustor 2 according to this embodiment. As shown in FIG. 2, the burner 5 includes a plurality of fuel nozzles 30, a base plate (first plate) 32, a turning plate (second plate) 33, and partition wall parts 37.

The configuration of each part of the burner 5 will be explained below. In this embodiment, multiple rows of air holes (air hole rows) arranged concentrically will be referred to as a first row, a second row, . . . , and an eighth row from inside to outside as needed.

Fuel Nozzle

As shown in FIG. 2, a plurality of fuel nozzles 30 for ejecting the fuel supplied from the fuel system 200 are supported by the fuel header 40. These fuel nozzles 30 are arranged in a plurality of (eight in this embodiment) concentric annular rows. In each annular row, the fuel nozzles 30 are formed around the whole circumference of the annular row.

Base Plate

Figure 5:
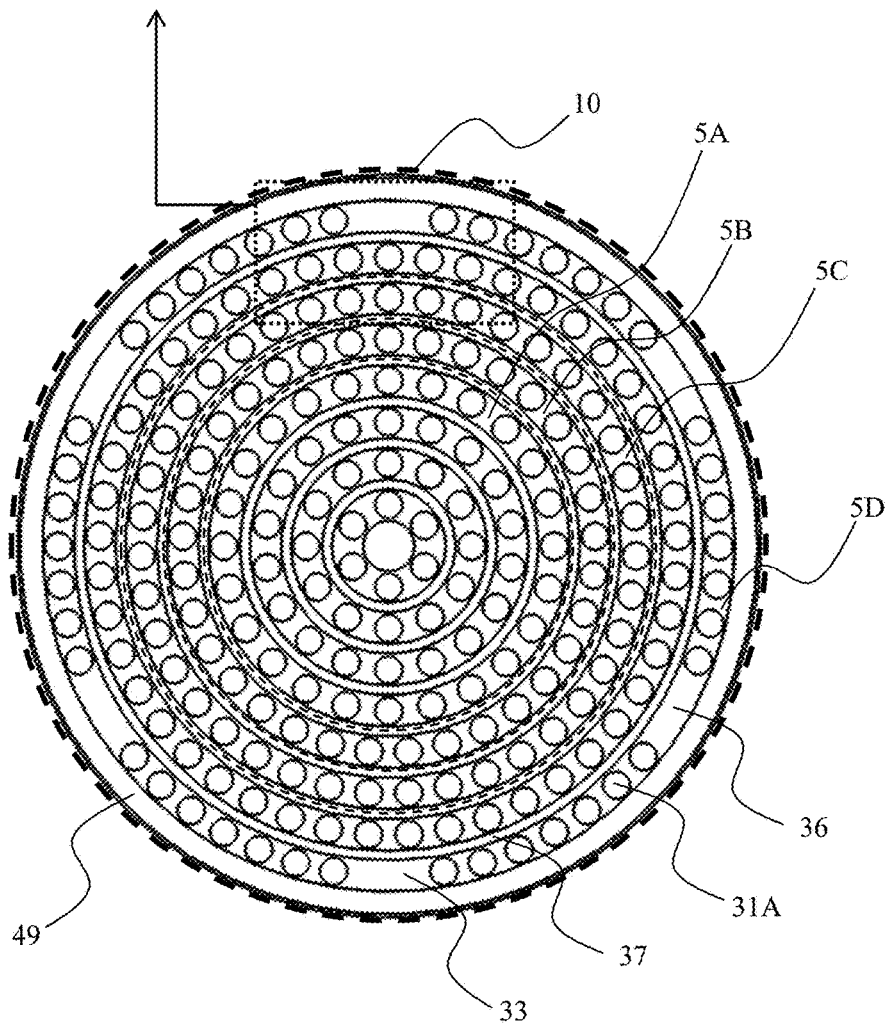
FIG. 5 is a schematic diagram of a base plate in the first embodiment of the present invention viewed from the downstream side.

FIG. 5 is a schematic diagram of the base plate 32 in this embodiment viewed from the downstream side. As shown in FIGS. 2 and 5, the base plate 32, as a disc-shaped plate coaxial with the central axis of the combustor liner 10, is arranged downstream of the fuel nozzles 30 in the fuel flow direction. The base plate 32 is formed with a plurality of (eight in this embodiment) concentric circular air hole rows made up of the air holes 31A corresponding to the fuel nozzles 30, respectively, have been formed. Thus, each air hole 31A is arranged on the fuel ejection side of a corresponding fuel nozzle 30 in its axial direction (downstream side in the fuel ejection direction) in association with the corresponding fuel nozzle 30. With one fuel nozzle 30 and one air hole 31A arranged in association with each other as in this example, a coaxial jet, in which the fuel (fuel jet) 34 ejected from the fuel nozzle 30 is surrounded and covered with the air (air jet) 35 flowing through the air hole 31, flows through the base plate 32. These air holes 31A are formed around the whole circumference of each annular air hole row. In this embodiment, each air hole 31A is formed in the shape of a right cylinder in which the two circles forming the end faces are orthogonal to the generating line, and arranged coaxially with the corresponding fuel nozzle 30. Each fuel nozzle 30 is not inserted into the corresponding air hole 31A, that is, the end face of the air hole 31A on the upstream side in the fuel flow direction (hereinafter referred to as an "inlet" as needed) is apart from the end of the fuel nozzle 30 on the downstream side in the fuel flow direction.

Turning Plate

As shown in FIG. 2, the turning plate 33 is arranged downstream of the base plate 32 in the fuel flow direction to face the base plate 32. Through the turning plate 33, a plurality of concentric circular air hole rows made up of air holes 31B and corresponding to the plurality of (eight in this embodiment) air hole rows of the base plate 32 have been formed. These air holes 31B are formed around the whole circumference of each annular air hole row. In this embodiment, the number of air holes 31B equals the number of air holes 31A of the base plate 32.

Figure 3:
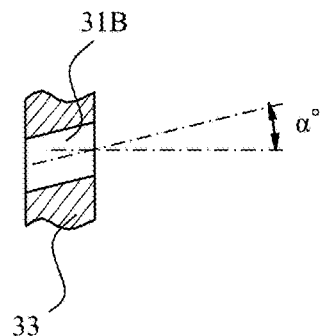
FIG. 3 is an enlarged view of a turning plate in the first embodiment of the present invention (cross-sectional view taken along the line III-III in FIG. 4).
Figure 4:
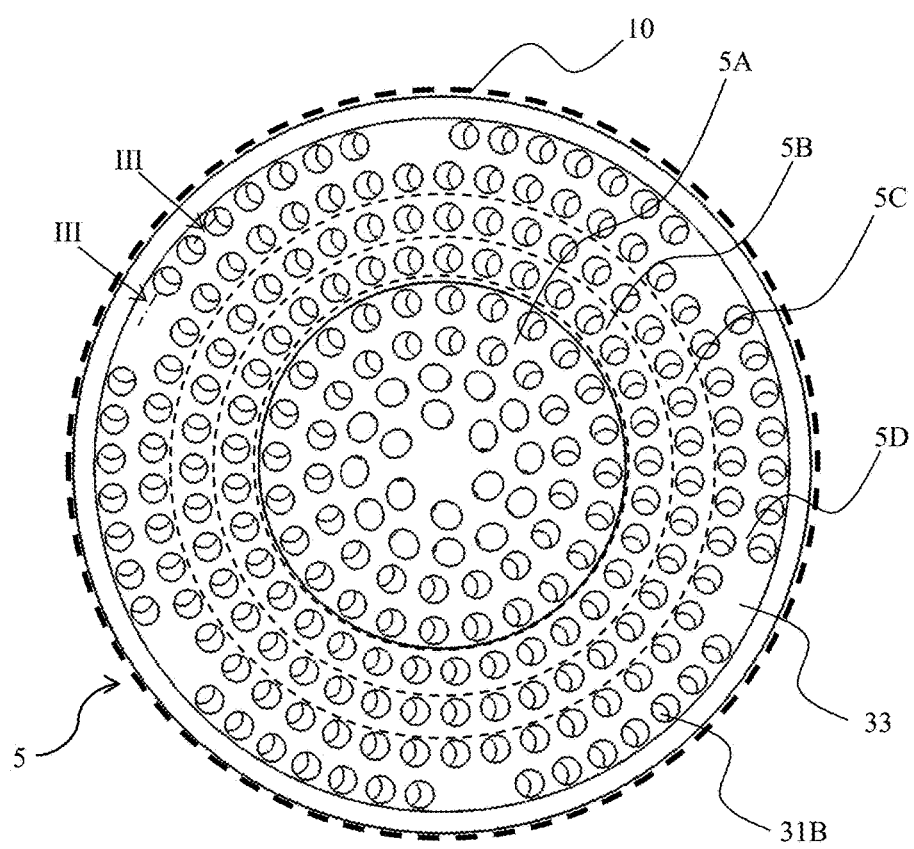
FIG. 4 is a schematic diagram of the turning plate in the first embodiment of the present invention viewed from the downstream side.

FIG. 3 is an enlarged view of the turning plate 33 in this embodiment (cross-sectional view taken along the line III-III in FIG. 4). FIG. 4 is a schematic diagram of the turning plate 33 in this embodiment viewed from the downstream side.

As shown in FIG. 3, each air hole 31B is formed in the shape of an oblique cylinder in which the two ellipses forming the end faces are not orthogonal to the generating line. The air hole 31B is a turning air hole having a turning angle. The end of the air hole 31B on the downstream side in the flow direction of the air-fuel mixture (hereinafter referred to as an "outlet" as needed) is shifted from the position of the upstream end (hereinafter referred to as an "inlet" as needed) in the circumferential direction. Specifically, the central axis of the air hole 31B (obtained by connecting the centers of two circles at both ends of the air hole 31B) is oblique to the turning plate 33 in the circumferential direction to have a prescribed angle $\alpha°$ from the central axis of the fuel nozzle 30, the central axis of the air hole 31A, or the central axis of the combustor liner 10. In short, the air hole 31B is oblique to the turning plate 33 in the circumferential direction by the prescribed angle $\alpha°$. Here, the expression "have a prescribed angle" in this embodiment means that the central axis of the air hole 31B is not parallel or orthogonal to the other central axis (the central axis of the fuel nozzle 30, the central axis of the air hole 31A, or the central axis of the combustor liner 10). The angle $\alpha°$ is an element prescribing the air ejection direction from the air hole 31B. The angle $\alpha°$ has been set at an optimum value in each air hole row of the air holes 31B.

As shown in FIG. 2, the base plate 32 and the turning plate 33 are attached to the fuel header 40 via a support 15. The base plate 32 and the turning plate 33 are held in the combustor liner 10 via a spring seal 14. In this embodiment, the support 15 is in a shape formed by bending a flat plate. By forming the support 15 in such a shape, thermal expansion in the circumferential direction can be absorbed by the bent structure and the reliability of the burner 5 can be increased.

As shown in FIG. 4, the burner 5 constituting a combustion unit of the gas turbine combustor 2 is divided into multiple regions. In this embodiment, four rows forming the innermost one of the regions (first through fourth rows) constitute a first-group combustion unit (F1 burner) 5A, the fifth row constitutes a second-group combustion unit (F2 burner) 5B, the sixth row constitutes a third-group combustion unit (F3 burner) 5C, and two rows on the peripheral side (seventh and eighth rows) constitute a fourth-group combustion unit (F4 burner) 5D. The F1-F4 fuel systems 201-204 are connected to the F1-F4 burners 5A-5D via the aforementioned first through fourth headers 51-54, respectively. Such a group structure with the fuel systems 201-204 branching out from the fuel system 200 makes it possible to carry out the so-called "fuel staging" (changing the number of fuel nozzles 30 used for the fuel supply in stages in response to the change in the fuel flow rate required by the gas turbine).

In the F1 burner 5A, the gap formed between two air holes 31B adjoining each other in the circumferential direction (inter-hole distance) has been set greater than the flame quenching distance. With this setting, the flame approaches the turning plate 33 and the stability of the flame is enhanced. In contrast, in the F2 burner 5B, the F3 burner 5C and the F4 burner 5D, the gap formed between two air holes 31B adjoining each other in the circumferential direction (inter-hole distance) has been set less than or equal to the flame quenching distance, by which the flame is formed apart from the turning plate 33. The mixing of the fuel jet 34 and the air jet 35 progresses rapidly when the channel suddenly enlarges from the air holes 31B to the combustion chamber 50. If the flame is formed at a position apart downstream from the turning plate 33, low NOx combustion can be performed since premixed gas of fuel and air sufficiently mixed together reaches the flame and combusts.

Partition Wall Part

As explained above, the first combustion unit F1 and the second through fourth combustion units F2-F4 have different functions; the first combustion unit F1 has the function of enhancing stable combustion while the second combustion unit F2, the third combustion unit F3 and the fourth combustion unit F4 have the function of performing low NOx combustion. To achieve both the enhancement of stable combustion and the low NOx combustion, it is necessary to promote the mixing of fuel and air while precisely controlling the flow rate of the fuel supplied to each combustion unit. For this purpose, the base plate 32 in this embodiment is provided with the partition wall parts 37 which partition a space part 46 formed between the base plate 32 and the turning plate 33 into rooms corresponding to the air hole rows of the base plate 32 and the turning plate 33.

The space part 46 exists between the base plate 32 and the turning plate 33 (see FIG. 2, for example). The periphery of the space part 46 is covered by a burner partition wall 49. The space part 46 connects with the end of each air hole 31A of the base plate 32 on the downstream side in the flow direction of the air-fuel mixture (hereinafter referred to as an "outlet" as needed) and the inlet of each air hole 31B. Thus, the air holes 31A and the air holes 31B are connected with each other via the space part 46. Incidentally, only the air-fuel mixture of the fuel jet 34 and the air jet 35 ejected from the air holes 31A flows through the space part 46 covered by the burner partition wall 49; there is no inflow of secondary fuel, secondary air, etc. into the space part 46 covered by the burner partition wall 49.

As shown in FIG. 5, the partition wall parts 37 (seven partition wall parts 37 in this embodiment) are formed concentrically corresponding to the air hole rows made up of the air holes 31A. Each partition wall part 37 extends from the base plate 32 to the turning plate 33 and contacts the opposing surface of the turning plate 33 (see FIG. 2). By these partition wall parts 37, the space part 46 is partitioned into a plurality of annular internal channels 36 (eight internal channels 36 in this embodiment). These internal channels 36 are formed in a concentric circular pattern.

Figure 6:
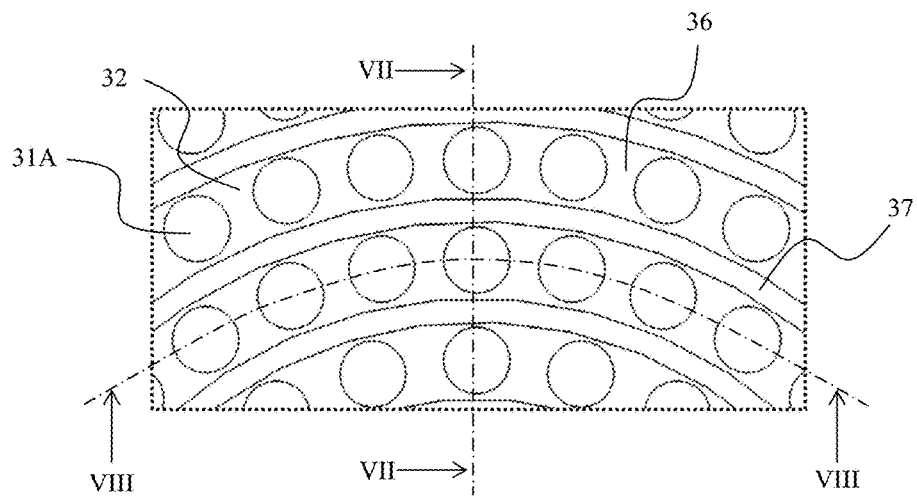
FIG. 6 is an enlarged view of the region surrounded by dotted lines in FIG. 5.
Figure 7:
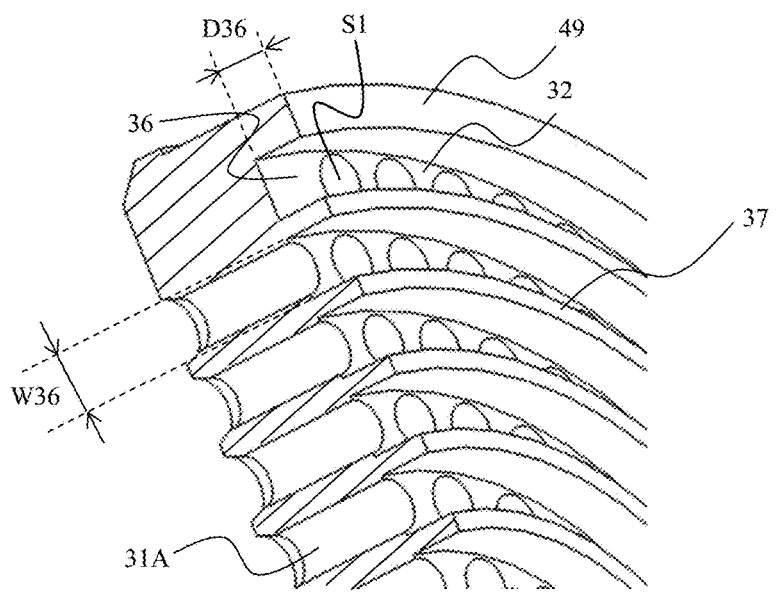
FIG. 7 is a perspective view of the VII-VII cross section in FIG. 6.

FIG. 6 is an enlarged view of the region surrounded by dotted lines in FIG. 5. FIG. 7 is a perspective view of the VII-VII cross section in FIG. 6. As shown in FIGS. 6 and 7, the width W36 of each internal channel 36 (dimension of the internal channel 36 in the radial direction of the base plate 32) has been set at a dimension greater than or equal to the hole diameter of the air hole 31A. The depth D36 of each internal channel 36 with reference to the plane where the partition wall parts 37 contact the turning plate 33 (dimension of the internal channel 36 in the radial direction of the base plate 32) has been set at a dimension equivalent to the hole diameter of the air hole 31A. Let S31 represent the cross-sectional area of the air hole 31A (one air hole 31A), the width W36 and the depth D36 of the internal channel 36 are desired to be set to satisfy the following expression (1):

$$S31 \leq W36 \times D36 \tag{1}$$

The expression (1) indicates that the cross-sectional area of the internal channel 36 is greater than or equal to that of the air hole 31A.

If the width W36 and the depth D36 of the internal channel 36 are set to satisfy S31>W36×D36 contrary to the expression (1), the flow velocity in the internal channel 36 increases and the mixing of fuel and air is promoted; however, the efficiency of the gas turbine plant 1000 can drop due to an increase in the pressure loss.

In contrast, if the width W36 and the depth D36 of the internal channel 36 are set greater than the hole diameter of the air hole 31A, a non-stationary vortex or stagnation can locally occur in the internal channel 36 and deteriorate the reliability of the combustor. Therefore, the width W36 and the depth D36 of the internal channel 36 are desired to be set to satisfy the following expression (2):

$$2 \times S31 > W36 \times D36 \tag{2}$$

(Operation)

Next, the combustion operation of the gas turbine combustor 2 according to this embodiment will be explained below by referring to figures.

Figure 8:
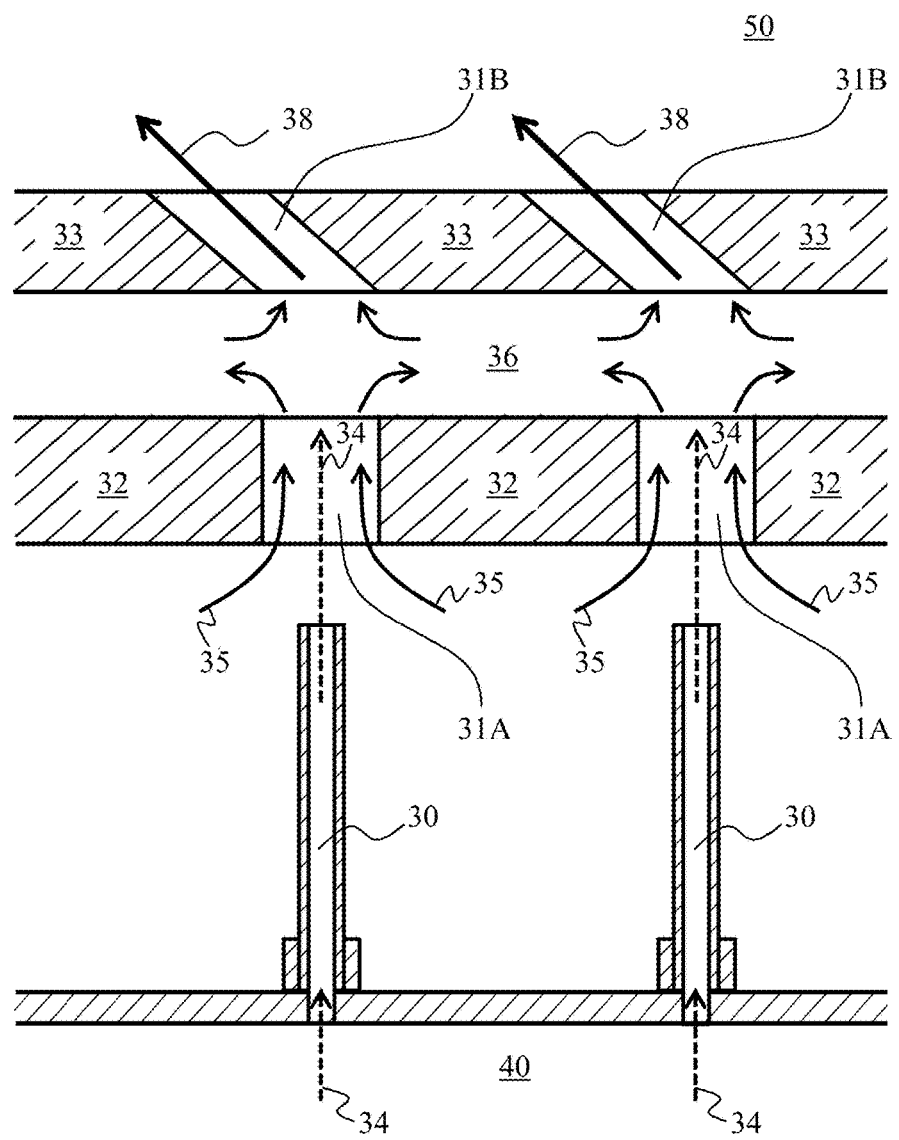
FIG. 8 is a cross-sectional view schematically showing the flow of fuel and air in the burner in the first embodiment of the present invention (cross-sectional view taken along the line VIII-VIII in FIG. 6).

FIG. 8 is a cross-sectional view schematically showing the flow of fuel and air in the burner 5 in this embodiment (cross-sectional view taken along the line VIII-VIII in FIG. 6). As shown in FIGS. 2 and 8, the high-pressure air 101 which has been led to the combustion chamber 50 via the channels 47 and 48 flows into the air holes 31A formed through the base plate 32 of the air hole plate 39 as the air jets 35. Meanwhile, the fuel which has been supplied from the fuel system 200 to the fuel nozzles 30 via the fuel header 40 is ejected from the discharge holes of the fuel nozzles 30 and flows into the air holes 31A as the fuel jets 34. Each fuel jet 34 flowing into the air hole 31A is surrounded and covered by the air jet 35, flows downstream from the air hole 31A to an internal channel 36 of the space part 46, and fills the internal channel 36. Since the degree of mixing of the air-fuel mixture jet of the fuel jet 34 and the air jet 35 is still low, the fuel concentration is high in the central part and low in the peripheral part. The temperature of the fuel jet 34 is several hundred ° C. lower than that of the air jet 35, and thus the temperature of the air-fuel mixture jet ejected from the air hole 31A is low in the central part and high in the peripheral part. When the air-fuel mixture jet flows into the internal channel 36, the channel for the jet suddenly enlarges and the mixing is promoted in the vicinity of the inlet of the internal channel 36 (outlet of the air hole 31A) (primary mixing). The air-fuel mixture of the fuel jet 34 and the air jet 35 formed by the primary mixing (primary air-fuel mixture) flows from the internal channel 36 into an air hole 31B formed through the turning plate 33. When the primary air-fuel mixture flows into the air hole 31B, the channel size suddenly reduces and the mixing is promoted further in the vicinity of the inlet of the air hole 31B (outlet of the internal channel 36) (secondary mixing). The air-fuel mixture of the fuel jet 34 and the air jet 35 formed by the secondary mixing (secondary air-fuel mixture) flows through the air hole 31B. Since the air hole 31B is formed as a path inclined at the angle α° (oblique cylindrical path), a force component in a turning direction is given to the secondary air-fuel mixture flowing through the air hole 31B and a circulating flow is formed. Since the outlet of the air hole 31B is open to the combustion chamber 50, the channel for the secondary air-fuel mixture suddenly enlarges and the mixing is promoted further in the vicinity of the outlet of the air hole 31B (tertiary mixing). The air-fuel mixture of the fuel jet 34 and the air jet 35 formed by the tertiary mixing (tertiary air-fuel mixture) is ejected into the combustion chamber 50 as premixed gas 38 while turning and is combusted in the combustion chamber 50.

Figure 9:
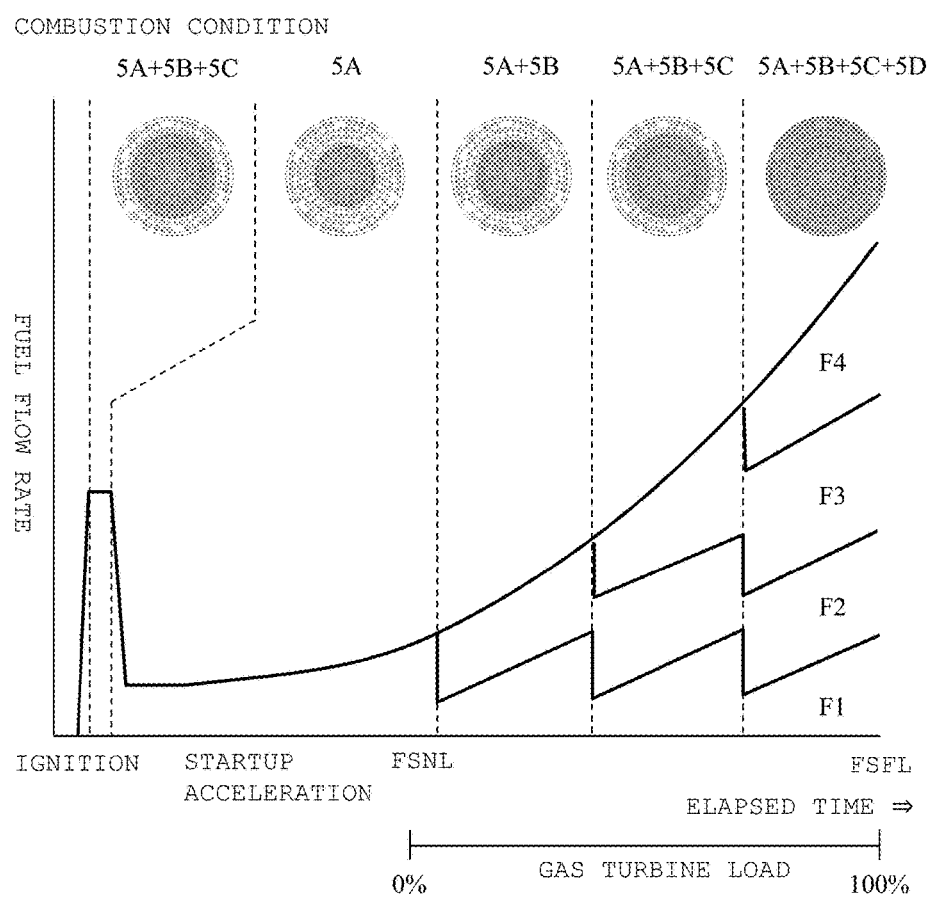
FIG. 9 is a schematic diagram showing fuel staging in the gas turbine combustor in accordance with the first embodiment of the present invention.

FIG. 9 is a schematic diagram showing the fuel staging in the gas turbine combustor 2 according to this embodiment. In FIG. 9, the horizontal axis represents the elapsed time and the vertical axis represents the fuel flow rate.

As shown in FIG. 9, at the ignition of the gas turbine, the fuel is supplied from the fuel system 200 to the F1 burner 5A, the F2 burner 5B and the F3 burner 5C, whereas the F4 burner 5D is supplied with no fuel.

After the gas turbine ignition, the operation is switched to solo combustion of the F1 burner 5A and the turbine 3 is accelerated until the turbine 3 reaches the rated revolution speed no load state (FSNL: Full Speed No Load). In this period, only the F1 burner 5A is supplied with the fuel from the fuel system 200. The F2 burner 5B, the F3 burner 5C and the F4 burner 5D are supplied with no fuel.

After the turbine 3 has accelerated to the rated revolution speed, the power generation is started and the load is increased gradually. With the increase in the load, the fuel supply range (area) is enlarged in stages (the fuel is successively supplied in the order of the F2 burner 5B, the F3 burner 5C and the F4 burner 5D) so that the fuel-air ratio of the burner 5 of the gas turbine combustor 2 remains in a stable combustion range. In the combustion condition in which all the F1-F4 burners 5A-5D are supplied with the fuel, the rated revolution speed full load state (FSFL: Full Speed Full Load) is achieved.

(Effect)

(1) In this embodiment, the space part 46 between the base plate 32 and the turning plate 33 is partitioned by the partition wall parts 37 into rooms corresponding to the air hole rows of the base plate 32 and the turning plate 33. Therefore, even when the fuel is injected from part of the fuel nozzles 30 in the partial load operation of the burner 5, the air-fuel mixture ejected from part of the air holes 31A is not diluted in the space between the base plate 32 and the turning plate 33 by air ejected from air holes 31A of the other air hole rows. Accordingly, the fuel-air ratio of the premixed gas 38 ejected from the air holes 31B into the combustion chamber 50 can be prevented from becoming excessively low. Further, since the flow rate and the fuel-air ratio of the premixed gas 38 ejected from the air holes 31B into the combustion chamber 50 can be equalized among the air holes 31B belonging to the same row, circumferential deviations in the flow rate and the fuel-air ratio in the burner 5 can be reduced. Therefore, it becomes possible to precisely control the fuel-air ratio of the premixed gas 38 ejected from each air hole 31B and thereby achieve stable combustion in a series of operation steps from the ignition of the gas turbine to the full load operation while also reducing the NOx emission.

(2) In this embodiment, the cross-sectional area of each internal channel 36 formed in the space part 46 by the partitioning by the partition wall parts 37 is set larger than or equal to the cross-sectional area of the air hole 31A of the base plate 32. Therefore, the increase in the flow velocity of the air-fuel mixture jet in the internal channel 36 can be suppressed and the drop in the efficiency of the gas turbine plant 1000 due to the increase in the pressure loss can be reduced.

(3) In this embodiment, the group structure enabling the individual control of the F1-F4 burners 5A-5D is employed by branching the fuel system 200 into the fuel systems 201-204. With the group structure, the fuel staging (changing the number of fuel nozzles 30 used for the fuel supply in stages in response to the change in the fuel flow rate required by the gas turbine) can be carried out. Accordingly, stable combustion in the partial load operation of the gas turbine can be performed while also reducing the NOx emission.

(4) In this embodiment, in the F1 burner 5A, the distance between two air holes 31B adjoining each other in the circumferential direction is set greater than the flame quenching distance. Accordingly, the flame approaches the turning plate 33 and the stability of the flame can be enhanced further.

(5) In this embodiment, the fuel and air mix together in stages. Therefore, the fuel and air can be prevented from perfectly mixing together in the air hole 31A, by which spontaneous ignition of the fuel in the air hole 31A can be prevented. Accordingly, erosion (melting) of the base plate 32 and the turning plate 33 can be prevented and the reliability of the gas turbine combustor 2 can be increased.

In this embodiment, the downstream ends of the fuel nozzles 30 in the fuel flow direction are apart from the inlets of the air holes 31A. Therefore, the increase in the flow velocity of the fuel in the air hole 31A can be suppressed and the drop in the efficiency of the gas turbine plant 1000 due to the increase in the pressure loss can be reduced in comparison with a configuration in which the tip ends of the fuel nozzles 30 are inserted into the air holes 31A, for example.

In this embodiment, the fuel jet 34 and the air jet 35 are ejected into the combustion chamber 50 in the form of a coaxial jet, by which the interfacial area between the fuel and air is increased and the mixing of the fuel and air is promoted further. Accordingly, the amount of NOx generated by the combustion in the combustion chamber 50 can be reduced.

In this embodiment, due to the inclination angle α° of the air holes 31B in the circumferential direction, the fluid flowing through the air holes 31B is injected from the air holes 31B while forming a circulating flow. Accordingly, flame with higher stability can be formed.

(6) According to this embodiment, the gas turbine combustor is formed in simple structure in which the turning plate 33 having the air hole rows corresponding to the air hole rows of the base plate 32 is arranged downstream of the base plate 32 and the partition wall parts 37 are arranged to partition the space part 46 between the base plate 32 and the turning plate 33 into rooms corresponding to the air hole rows. Therefore, the gas turbine combustor can be manufactured with ease by modifying an existing gas turbine combustor. For example, the present invention is easily applicable to an existing gas turbine combustor comprising: a combustion chamber in which fuel is burned with air to generate combustion gas; a plurality of fuel nozzles arranged in multiple concentric annular rows; and a base plate arranged downstream of the fuel nozzles and having multiple concentric circular air hole rows made up of a plurality of air holes corresponding to the fuel nozzles, by arranging the turning plate 33 downstream of the base plate and arranging the partition wall parts 37 in the space part between the base plate and the turning plate 33.

Second Embodiment

Figure 10:
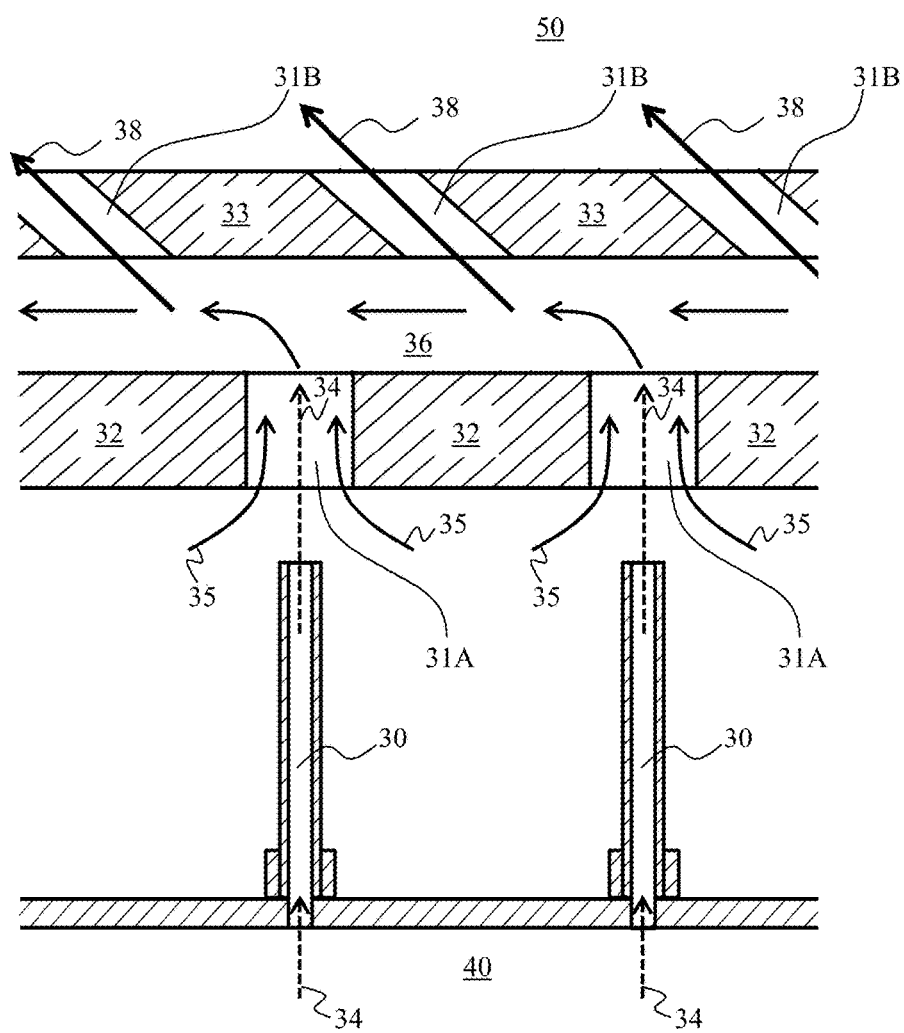
FIG. 10 is a cross-sectional view schematically showing the flow of fuel and air in a gas turbine combustor in accordance with a second embodiment of the present invention.

FIG. 10 is a cross-sectional view schematically showing the flow of fuel and air in a gas turbine combustor according to this embodiment. Elements in FIG. 10 equivalent to those in the above-described first embodiment are assigned the already-used reference characters and repeated explanation thereof is appropriately omitted.
(Configuration)
This embodiment differs from the first embodiment in the configuration of the air holes 31B of the turning plate 33. The configuration of the air holes 31B will be explained below.

While the air holes 31B in the first embodiment are formed at positions corresponding to the air holes 31A in the circumferential direction, the air holes 31B in this embodiment are formed as shown in FIG. 10. In FIG. 10, the inlets of the air holes 31B of the turning plate 33 connecting to the space part 46 and the outlets of the air holes 31A connecting to the space part 46 are shifted from each other in the circumferential direction. Specifically, the intersection point between the central axis of each air hole 31B and the surface of the turning plate 33 on the fuel nozzle 30's side (i.e., the center of the inlet of the air hole 31B) is apart from the central axis of the corresponding air hole 31A in the circumferential direction. On the central axis of each air hole 31A, a wall surface of the turning plate 33 is situated. The rest of the configuration is equivalent to that in the first embodiment.
(Operation)
As shown in FIG. 10, the fuel jet 34 ejected from the fuel nozzle 30 and the air jet 35 form the primary air-fuel mixture in the internal channel 36 similarly to the first embodiment. The primary air-fuel mixture collides with the wall surface of the turning plate 33 situated on the central axis of the air hole 31A and then flows in the circumferential direction along the internal channel 36. Thereafter, the primary air-fuel mixture flows into an air hole 31B and is supplied to the combustion chamber 50 as the premixed gas 38 and combusted similarly to the first embodiment.
(Effect)
According to this embodiment, the following effects are achieved in addition to the effects of the first embodiment.

In this embodiment, the outlets of the air holes 31A and the inlets of the air holes 31B are shifted from each other in the circumferential direction and a wall surface of the turning plate 33 is situated on the central axis of each air hole 31A. Accordingly, the air-fuel mixture jet ejected from the air hole 31A with a low-temperature part existing at the center of the jet collides with the wall surface. Thus, the turning plate 33 heated by the thermal radiation from the flame in the combustion chamber 50 can be cooled down and the operating life of the turning plate 33 can be increased. Further, since a flow of the air-fuel mixture jet, flowing into the internal channel 36, in the circumferential direction (one direction) is induced, the distance for which the air-fuel mixture jet flows in the internal channel 36 (hereinafter referred to as a "mixing distance") can be made longer than that in the first embodiment. Therefore, the mixing of fuel and air in the internal channel 36 can be promoted further and the NOx emission can be reduced further.

Third Embodiment

Figure 11:
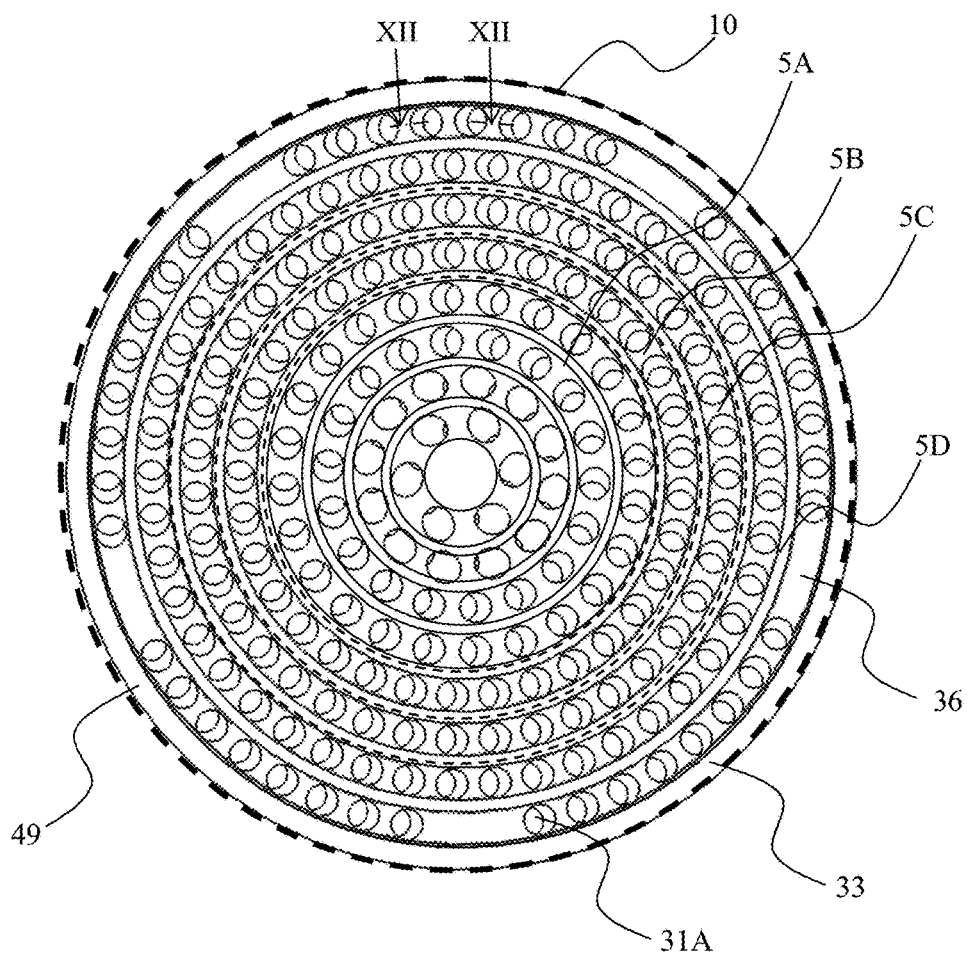
FIG. 11 is a schematic diagram of a base plate of a gas turbine combustor in accordance with a third embodiment of the present invention viewed from the downstream side.
Figure 12:
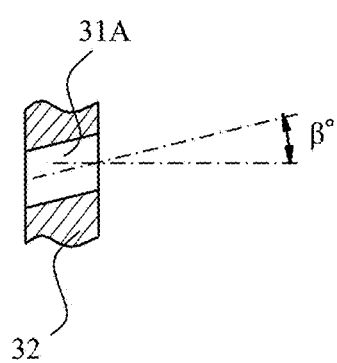
FIG. 12 is an enlarged view of the base plate of the gas turbine combustor in accordance with the third embodiment of the present invention (cross-sectional view taken along the line XII-XII in FIG. 11).
Figure 13:
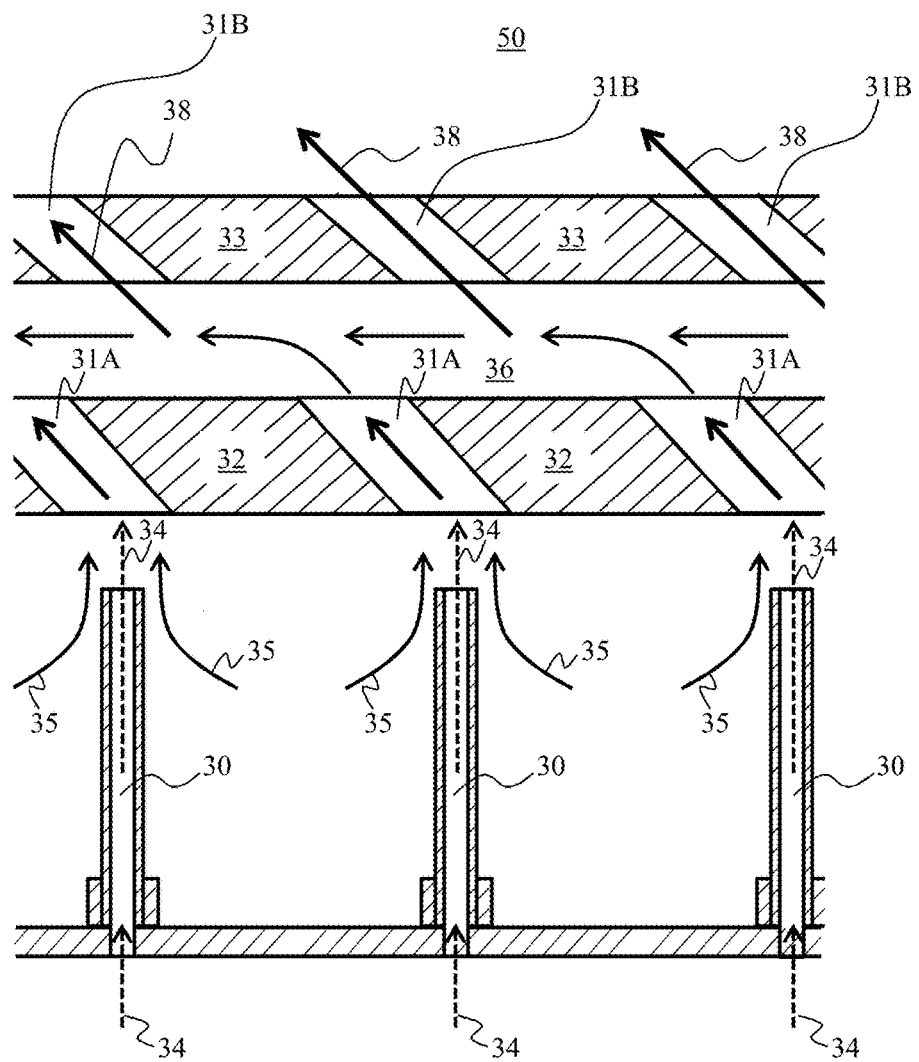
FIG. 13 is a cross-sectional view schematically showing the flow of fuel and air in the gas turbine combustor in accordance with the third embodiment of the present invention.

FIG. 11 is a schematic diagram of a base plate of a gas turbine combustor according to this embodiment viewed from the downstream side. FIG. 12 is an enlarged view of the base plate of the gas turbine combustor according to this embodiment (cross-sectional view taken along the line XII-XII in FIG. 11). FIG. 13 is a cross-sectional view schematically showing the flow of fuel and air in the gas turbine combustor according to this embodiment. Elements in FIGS. 11-13 equivalent to those in the first embodiment are assigned the already-used reference characters and repeated explanation thereof is appropriately omitted.
(Configuration)
This embodiment differs from the above-described embodiments in the configuration of the air holes 31A.

As shown in FIGS. 11 and 12, in this embodiment, the central axis of the air hole 31A of the base plate 32 (obtained by connecting the centers of the two circles at both ends of the air hole 31A) extends obliquely with respect to the circumferential direction of the base plate 32 to have a prescribed angle $\beta°$ from the central axis of the fuel nozzle 30 or the central axis of the combustor liner 10. In short, the air hole 31A is formed to be oblique to the base plate 32 by the prescribed angle $\beta°$. Here, the expression "have a prescribed angle" in this embodiment means that the central axis of the air hole 31A is not parallel to the other central axis (the central axis of the fuel nozzle 30 or the central axis of the combustor liner 10). The angle $\beta°$ is an element prescribing the air ejection direction from the air hole 31A into the internal channel 36. The angle $\beta°$ has been set at an optimum value in each air hole row of the air holes 31A. The air hole 31A is formed as a path inclined at the angle $\beta°$ (oblique cylindrical path). The rest of the configuration (e.g., a wall surface of the turning plate 33 being situated on the central axis of each air hole 31A) is equivalent to that in the second embodiment.
(Operation)
As shown in FIG. 13, the fuel jet 34 ejected from the fuel nozzle 30 and the air jet 35 form the primary air-fuel mixture in the internal channel 36 similarly to the first embodiment and then collide with the wall surface of the turning plate 33 situated on the central axis of the air hole 31A. Since the air hole 31A is formed obliquely to the base plate 32 in this embodiment, the primary air-fuel mixture flows in the internal channel 36 in one direction (circumferential direction) in an orderly manner while colliding with the wall surface of the turning plate 33 and then flows into an air hole 31B. Thereafter, the air-fuel mixture is supplied to the combustion chamber 50 as the premixed gas 38 and combusted similarly to the first embodiment.
(Effect)

According to this embodiment, the following effects are achieved in addition to the effects of the above-described embodiments.

In this embodiment, each air hole 31A formed through the base plate 32 is inclined from the axial direction of the fuel nozzle 30 or the combustor liner 10 in the circumferential direction of the base plate 32. Therefore, a force component in a turning direction is actively given to the air-fuel mixture jet flowing through the air hole 31A. Accordingly, the primary air-fuel mixture in the internal channel 36 flows in one direction (circumferential direction of the internal channel 36) in an orderly manner while colliding with the wall surface of the turning plate 33. Consequently, the occurrence of a local vortex or stagnation to the primary air-fuel mixture in the internal channel 36 can be suppressed, the pressure loss occurring when the air-fuel mixture flows through the internal channel 36 can be reduced, and the mixing of fuel and air can be promoted.

Fourth Embodiment

Figure 14:
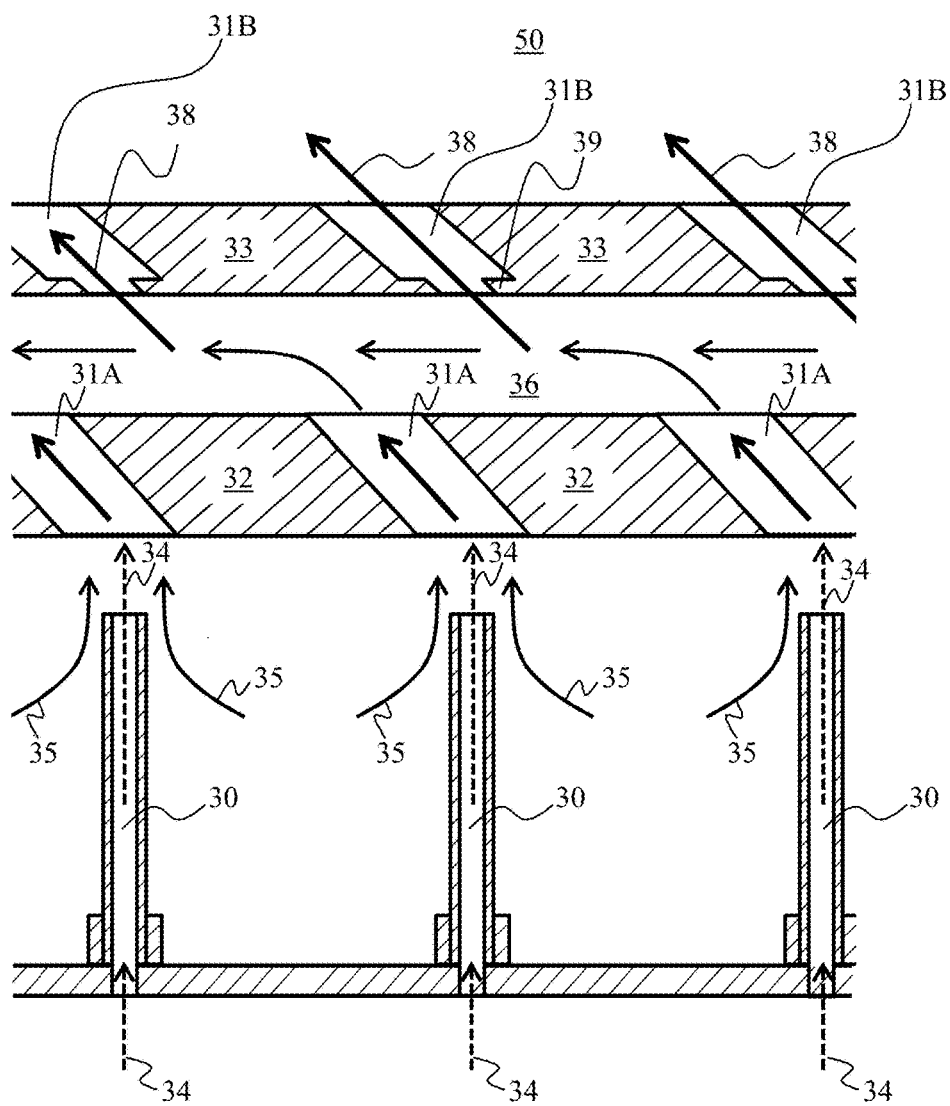
FIG. 14 is a cross-sectional view schematically showing the flow of fuel and air in a gas turbine combustor in accordance with a fourth embodiment of the present invention.

FIG. 14 is a cross-sectional view schematically showing the flow of fuel and air in a gas turbine combustor according to this embodiment. Elements in FIG. 14 equivalent to those in the first embodiment are assigned the already-used reference characters and repeated explanation thereof is appropriately omitted.
(Configuration)

This embodiment differs from the above-described embodiments in that the air hole 31B of the turning plate 33 is provided with a restrictor.

As shown in FIG. 14, in this embodiment, a step-like restrictor 39A is formed on the inlet side (fuel nozzle 30's side) of the air hole 31B formed through the turning plate 33. The restrictor 39A is formed so that the hole diameter of the air hole 31B decreases on the inlet side of the air hole 31B. As a result, the area of the inlet of the air hole 31B is decreased compared to the third embodiment, for example. Also in this embodiment, the intersection point between the central axis of each air hole 31B and the surface of the turning plate 33 on the fuel nozzle 30's side is apart from the central axis of the corresponding air hole 31A in the circumferential direction, and a wall surface of the turning plate 33 is situated on the central axis of each air hole 31A. The rest of the configuration is equivalent to that in the second embodiment.
(Operation)

As shown in FIG. 14, the fuel jet 34 ejected from the fuel nozzle 30 and the air jet 35 form the primary air-fuel mixture in the internal channel 36 similarly to the first embodiment. Similarly to the second embodiment, the primary air-fuel mixture collides with a wall surface of the turning plate 33 (situated on the central axis of the air hole 31A) while flowing in the internal channel 36 in the circumferential direction. In this embodiment, the hole diameter of the air hole 31B on the fuel nozzle 30's side is reduced by forming the restrictor 39A on the inlet side of the air hole 31B. Therefore, when the primary air-fuel mixture flowing in the internal channel 36 in the circumferential direction flows from the internal channel 36 into an air hole 31B of the turning plate 33, the primary air-fuel mixture is distributed to the air holes 31B of the same row more evenly compared to the first embodiment. Thereafter, the primary air-fuel mixture flows into the air holes 31B and is supplied to the combustion chamber 50 as the premixed gas 38 and combusted similarly to the first embodiment.
(Effect)

According to this embodiment, the following effects are achieved in addition to the effects of the above-described embodiments.

In this embodiment, the restrictor 39A is formed on the inlet side of the air hole 31B and the hole diameter of the air hole 31B is reduced. Therefore, the circumferential deviation in the flow rate of the premixed gas 38 injected from each air hole 31B into the combustion chamber 50 (flow rate deviation among the air holes) can be reduced further. Additionally, the mixing of fuel and air can be promoted further since the channel suddenly enlarges downstream of the restrictor 39A.

Fifth Embodiment

Figure 15:
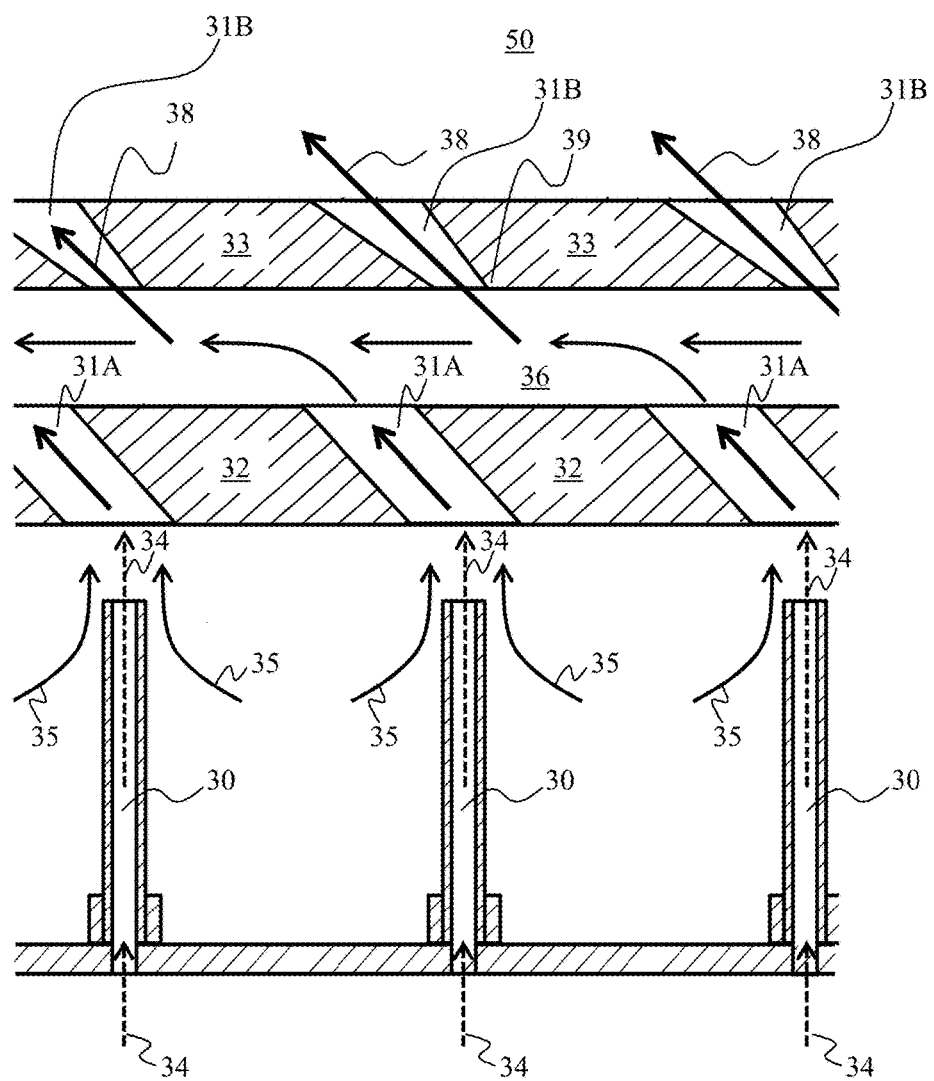
FIG. 15 is a cross-sectional view schematically showing the flow of fuel and air in a gas turbine combustor in accordance with a fifth embodiment of the present invention.

FIG. 15 is a cross-sectional view schematically showing the flow of fuel and air in a gas turbine combustor according to this embodiment. Elements in FIG. 15 equivalent to those in the first embodiment are assigned the already-used reference characters and repeated explanation thereof is appropriately omitted.
(Configuration)

This embodiment illustrates another example of the configuration of the restrictor formed in the air hole 31B of the turning plate 33.

As shown in FIG. 15, in this embodiment, a slope-like restrictor 39B is formed on the inlet side (fuel nozzle 30's side) of the air hole 31B of the turning plate 33 so that the hole diameter gradually decreases from the outlet side (combustion chamber 50's side) toward the inlet side of the air hole 31B. The restrictor 39B is formed so that the hole diameter of the air hole 31B hits the minimum at the end on the fuel nozzle 30's side. As a result, the area of the inlet of the air hole 31B is decreased compared to the third embodiment, for example. Also in this embodiment, the intersection point between the central axis of each air hole 31B and the surface of the turning plate 33 on the fuel nozzle 30's side is apart from the central axis of the corresponding air hole 31A in the circumferential direction, and a wall surface of the turning plate 33 is situated on the central axis of each air hole 31A. The rest of the configuration is equivalent to that in the second embodiment.
(Operation)

As shown in FIG. 15, the fuel jet 34 ejected from the fuel nozzle 30 and the air jet 35 form the primary air-fuel mixture in the internal channel 36 similarly to the first embodiment. Similarly to the second embodiment, the primary air-fuel mixture collides with a wall surface of the turning plate 33 (situated on the central axis of the air hole 31A) while flowing in the internal channel 36 in the circumferential direction. Since a restrictor (restrictor 39B) is formed on the inlet side of the air hole 31B also in this embodiment, the primary air-fuel mixture flowing in the internal channel 36 in the circumferential direction is distributed to the air holes 31B of the same row more evenly compared to the first embodiment similarly to the fourth embodiment. Thereafter, the primary air-fuel mixture flows into the air holes 31B and is supplied to the combustion chamber 50 as the premixed gas 38 and combusted similarly to the first embodiment.
(Effect)

According to this embodiment, the following effects are achieved in addition to the effects of the above-described embodiments.

In this embodiment, the slope-like restrictor 39B is formed on the inlet side (fuel nozzle 30's side) of the air hole 31B of the turning plate 33 so that the hole diameter gradually decreases from the outlet side (combustion chamber 50's side) toward the inlet side of the air hole 31B. Since the air hole 31B is formed in a tapered shape with no step, the increase in the pressure loss caused by the sudden enlargement of the channel when the air-fuel mixture flows from the internal channel 36 into the air hole 31B can be suppressed compared to the fourth embodiment and the efficiency of the gas turbine plant 1000 can be increased.

Sixth Embodiment

Figure 16:
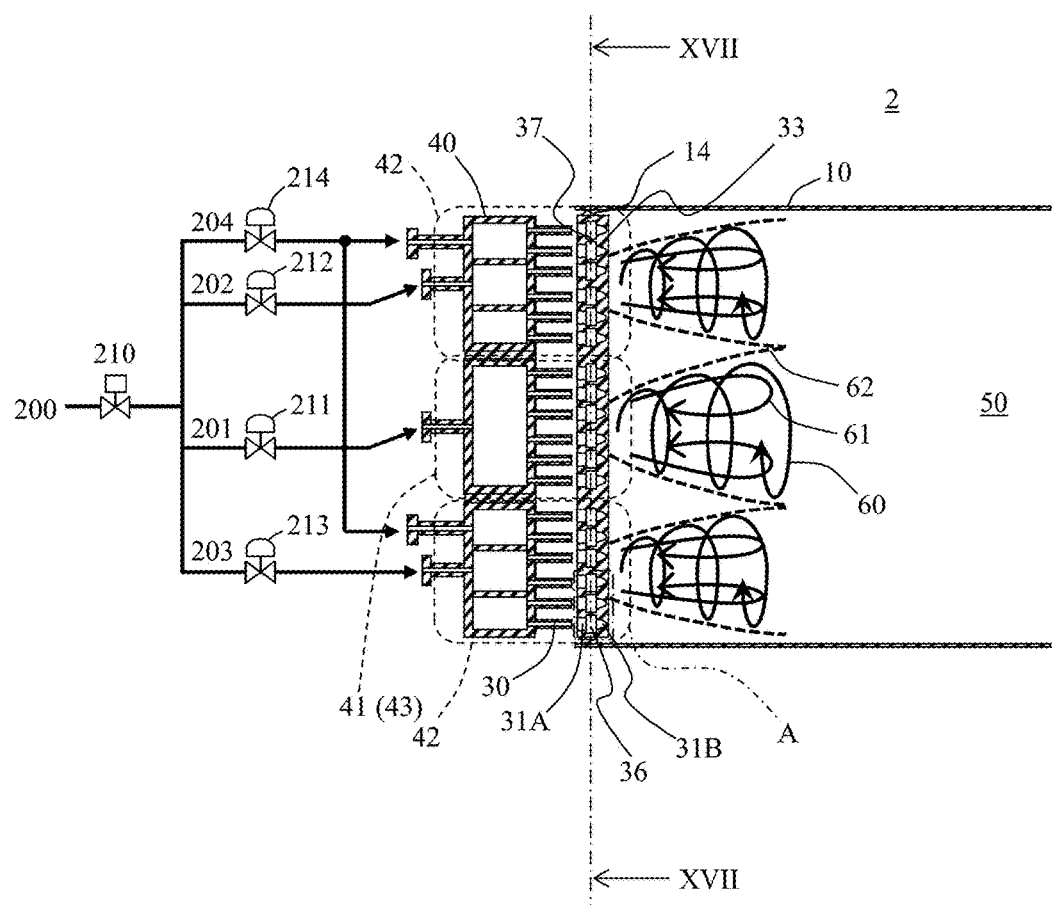
FIG. 16 is a cross-sectional view of a gas turbine combustor in accordance with a sixth embodiment of the present invention.
Figure 17:
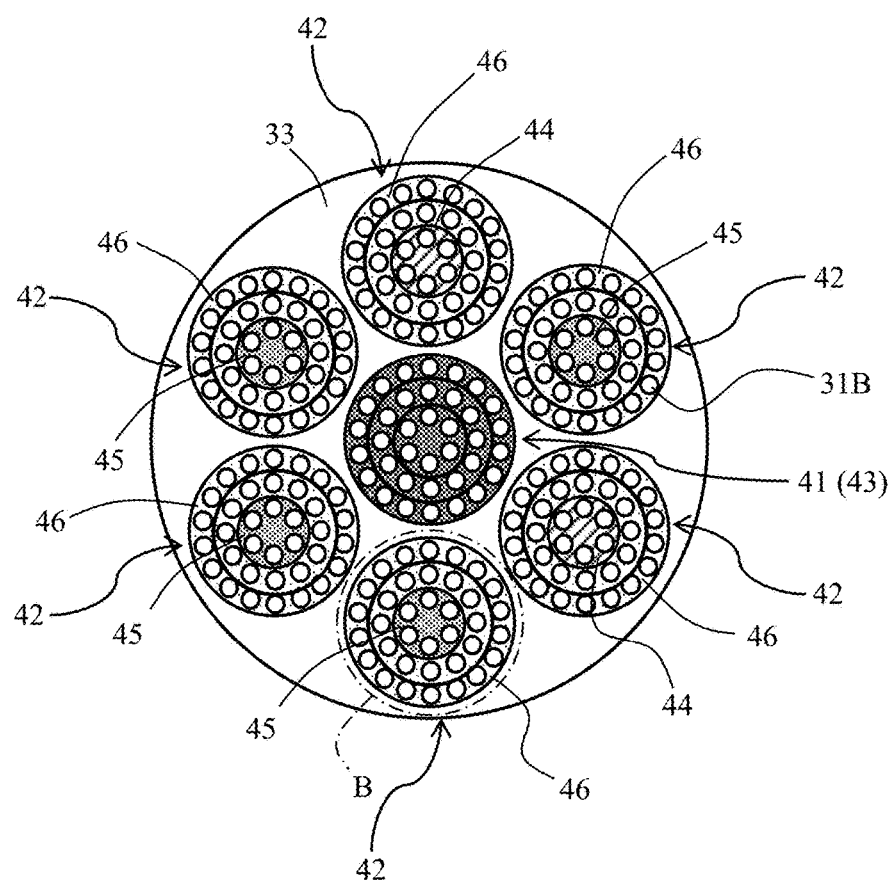
FIG. 17 is a schematic diagram of an air hole plate of the gas turbine combustor in accordance with the sixth embodiment of the present invention viewed from the downstream side (cross-sectional view taken along the line XVII-XVII in FIG. 16).

FIG. 16 is a cross-sectional view of a gas turbine combustor according to this embodiment. FIG. 17 is a schematic diagram of an air hole plate of the gas turbine combustor according to this embodiment viewed from the downstream side (cross-sectional view taken along the line XVII-XVII in FIG. 16). Elements in FIGS. 16 and 17 equivalent to those in the first embodiment are assigned the already-used reference characters and repeated explanation thereof is appropriately omitted.

In this embodiment, the present invention is applied to the so-called multiple injection gas turbine combustor in which a plurality of burners, each including a plurality of fuel nozzles and multiple air hole rows made up of air holes are arranged in a concentric circular pattern, are arranged in a combustion unit of the gas turbine combustor. In this embodiment, the concentrically arranged air hole rows will be referred to as the first row, the second row and the third row from the center toward the periphery as needed.

As shown in FIGS. 16 and 17, the gas turbine combustor 2 according to this embodiment comprises a plurality of burners in each of which a plurality of fuel nozzles 30 and multiple air hole rows made up of a plurality of air holes 31A and 31B are arranged in a concentric circular pattern (three rows of fuel nozzles 30 and three air hole rows in this embodiment). In each burner, six fuel nozzles 30 and air holes 31A and 31B are arranged in the first row, twelve fuel nozzles 30 and air holes 31A and 31B are arranged in the second row, and eighteen fuel nozzles 30 and air holes 31A and 31B are arranged in the third row.

At the center of the combustion unit of the gas turbine combustor 2, one burner (pilot burner) 41 is arranged coaxially with the gas turbine combustor 2 and six burners (main burners) 42 are arranged around the pilot burner 41. In short, the gas turbine combustor 2 in this embodiment is configured as a multi-burner structure including seven burners. The seven burners 41 and 42 share a base plate 32 and a turning plate 33. Specifically, the turning plate 33 of the burners 41 and 42 is provided with the air holes 31A and 31B, the partition wall parts 37, etc. of each embodiment described above.

Figure 18:
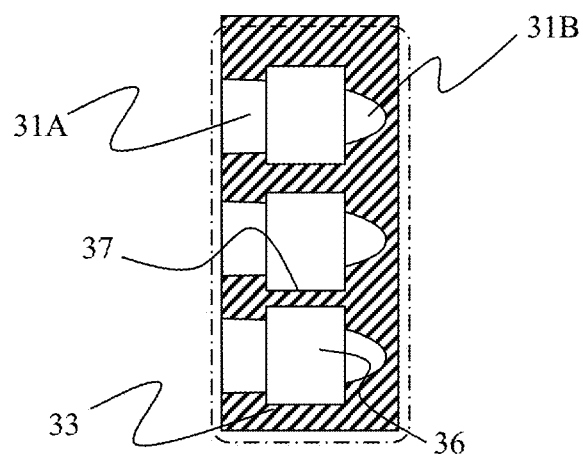
FIG. 18 is an enlarged view of a part of a turning plate surrounded by the chain lines (part A) in FIG. 16.
Figure 19:
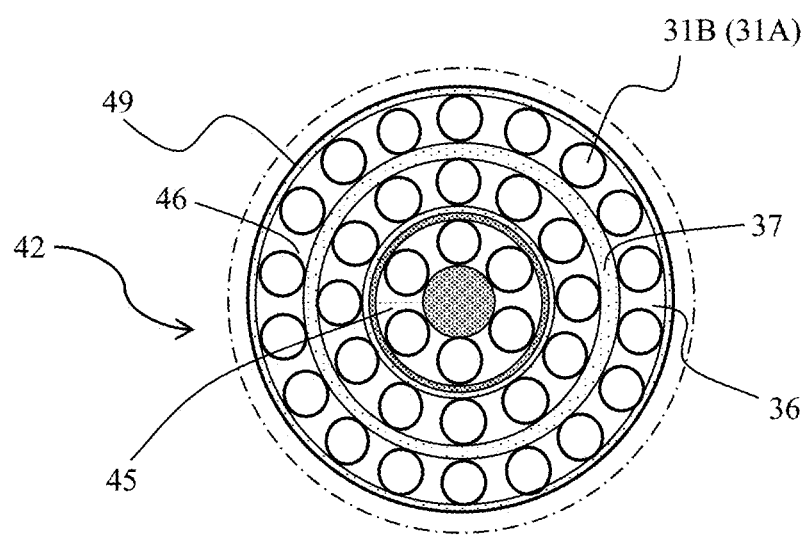
FIG. 19 is an enlarged view of a main burner surrounded by the chain line (part B) in FIG. 17.

FIG. 18 is an enlarged view of a part of the turning plate 33 surrounded by the chain lines (part A) in FIG. 16. FIG. 19 is an enlarged view of the main burner 42 surrounded by the chain line (part B) in FIG. 17. As shown in FIGS. 18 and 19, multiple partition wall parts 37 are formed in a concentric circular pattern so as to separate the air hole rows (made up of a plurality of air holes 31A and 31B) from each other (in this embodiment, two partition wall parts 37 are formed in each burner 41/42). By the partition wall parts 37, the space part 46 of the turning plate 33 is partitioned into multiple internal channels 36 for leading the air-fuel mixture (ejected from the air holes 31A) in the circumferential direction (in this embodiment, the space part 46 in each burner 41/42 is partitioned into three internal channels 36). The internal channels 36 are formed in a concentric circular pattern corresponding to the partition wall parts 37. Also in this embodiment, the air hole 31B is formed as a turning air hole having a turning angle as shown in FIG. 18.

As shown in FIG. 16, in this embodiment, the fuel is supplied from a fuel system 200 having a fuel shut-off valve 210 to the pilot burner 41 and the main burners 42 via a header 40. The fuel system 200 branches into four fuel systems: an F1 fuel system 201 having an F1 fuel flow control valve 211; an F2 fuel system 202 having an F2 fuel flow control valve 212; an F3 fuel system 203 having an F3 fuel flow control valve 213; and an F4 fuel system 204 having an F4 fuel flow control valve 214.

As shown in FIGS. 16 and 17, the F1 fuel system 201 is connected to an F1 burner 43 constituting the pilot burner 41. The flow rate of F1 fuel supplied to the F1 burner 43 is regulated by the F1 fuel flow control valve 211. The F2 fuel system 202 is connected to an F2 burner 44 constituting the first rows of two main burners 42 in the six main burners 42. The flow rate of F2 fuel supplied to the F2 burner 44 is regulated by the F2 fuel flow control valve 212. The F3 fuel system 203 is connected to an F3 burner 45 constituting the first rows of the remaining four main burners 42 in the six main burners 42. The flow rate of F3 fuel supplied to the F3 burner 45 is regulated by the F3 fuel flow control valve 213. The F4 fuel system 204 is connected to an F4 burner 46 constituting the second and third rows of the six main burners 42. The flow rate of F4 fuel supplied to the F4 burner 46 is regulated by the F4 fuel flow control valve 214.

Incidentally, while the partition wall parts 37 are formed in every burner (pilot burner 41, main burner 42) in this embodiment, it is sufficient if the partition wall parts 37 are formed only in burners that are required to perform the mixing of fuel and air with high accuracy. For example, it is possible to form the partition wall parts 37 only in the main burners 42 without forming the partition wall parts 37 in the pilot burner 41.

The operation of the gas turbine combustor 2 according to this embodiment will be explained below.

Also in this embodiment, the fuel jets 34 injected from the fuel nozzles 30 and the air jets 35 flowing into the gas turbine combustor 2 flow into the air holes 31A of each burner and then flow through the internal channels 36 and the air holes 31B in this order similarly to the first embodiment. Thereafter, as shown in FIG. 16, the air-fuel mixture is ejected from the air holes 31B of each burner while forming a swirl flow 60 and is supplied to the combustion chamber 50 as the premixed gas 38. In this case, the premixed gas 38 is ejected from the air holes 31B of each burner while forming the swirl flow 60. Due to the swirl flow 60, a circulating flow 61 is formed at each burner and flame surfaces 62 are formed in the combustion chamber 50. At the startup, the staging is performed and the fuel injection range (area) is enlarged in stages as explained in the first embodiment.

As above, the present invention is applicable also to the multiple injection gas turbine combustors with no problems.

Other Examples

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

While the fuel nozzles 30 and the air holes 31A are arranged coaxially with each other in the above embodiments, the central axes of the fuel nozzles 30 and the central axes of the air holes 31A do not need to perfectly coincide with each other as long as coaxial jets of fuel and air can be formed. It is sufficient if each fuel nozzle 30 extends toward or points the corresponding air hole 31A.

While the fuel nozzles 30, the air holes 31A and the air holes 31B are formed around the whole circumference of each annular row in the above embodiments, the essential effects of the present invention are precisely controlling the fuel-air ratio of each air hole and thereby achieving stable combustion in a series of operation steps from the ignition of the gas turbine to the full load operation while also reducing the NOx emission. Therefore, it is not absolutely necessary to form the fuel nozzles 30, the air holes 31A and the air holes 31B around the whole circumference of each annular row as long as the essential effects are achieved. For example, there are cases where the fuel nozzles 30, the air holes 31A and the air holes 31B are arranged in part of an annular row in the peripheral part.

While eight air hole rows are formed through the base plate 32 and the turning plate 33 in the first through fifth embodiments, the number of air hole rows formed through the base plate 32 and the turning plate 33 is not limited to eight as long as the aforementioned essential effects of the present invention are achieved. For example, the number of air hole rows formed through the base plate 32 and the turning plate 33 can be seven or less, or nine or more.

While the partition wall parts 37 are formed on the base plate 32 in the above embodiments, the partition wall parts 37 do not necessarily have to be formed on the base plate 32 as long as the aforementioned essential effects of the present invention are achieved. For example, the partition wall parts 37 may be formed on the turning plate 33, or independently of the base plate 32 and the turning plate 33.

While the number of the air holes 31A of the base plate 32 and the number of the air holes 31B of the turning plate 33 are equal to each other in the above embodiments, the numbers of the air holes 31A and 31B do not necessarily have to be set equal to each other as long as the aforementioned essential effects of the present invention are achieved. For example, the number of the air holes 31B may be set larger than that of the air holes 31A, or smaller than that of the air holes 31A While the tip ends of the fuel nozzles 30 are apart from the inlets of the air holes 31A of the base plate 32 in the above embodiments, the tip ends of the fuel nozzles 30 do not necessarily have to be arranged apart from the inlets of the air holes 31A as long as the aforementioned essential effects of the present invention are achieved. For example, the tip ends of the fuel nozzles 30 may also be inserted into the air holes 31A. In this case, the mixing of the fuel ejected from each fuel nozzle 30 and the air is promoted further thanks to an increase in the flow velocity of the air jet 35 caused by a decrease in the inlet area of the air hole 31A.

While the tip end of each fuel nozzle 30 is formed in a simple cylindrical shape in the above embodiments, it is also possible to arrange a protrusion at the tip end of each fuel nozzle 30 to cause a vortical flow in the fuel ejected and thereby further promote the mixing of fuel and air as long as the aforementioned essential effects of the present invention are achieved. The fuel nozzle 30 may also be formed to have two or more fuel ejection holes so as to enhance the dispersion of the fuel and thereby further promote the mixing of fuel and air.

DESCRIPTION OF REFERENCE CHARACTERS

2: gas turbine combustor
30: fuel nozzle
32: base plate (first plate)
33: turning plate (second plate)
37: partition wall part
46: space part
50: combustion chamber

The invention claimed is:
1. A gas turbine combustor comprising:
   a combustion chamber in which fuel is burned with air to generate combustion gas;
   a plurality of fuel nozzles arranged in multiple concentric annular rows;
   a first plate arranged downstream of the plurality of fuel nozzles and having multiple concentric circular air hole rows made up of a plurality of air holes of the first plate corresponding to the plurality of fuel nozzles;
   a second plate arranged downstream of the first plate to face the first plate and having multiple air hole rows corresponding to the multiple concentric circular air hole rows of the first plate, the multiple air hole rows of the second plate made up of a plurality of air holes of the second plate, an outlet of each of the plurality of air holes of the second plate being open to the combustion chamber; and
   partition wall parts, which are formed concentrically corresponding to the multiple concentric circular air hole rows of the first plate and the multiple air hole rows of the second plate, extend from the first plate to the second plate, and contact an opposing surface of the second plate, the partition wall parts partitioning a space part between the first plate and the second plate into a plurality of annular internal channels corresponding to the multiple concentric circular air hole rows of the first plate.
2. The gas turbine combustor according to claim 1, wherein positions of outlets of the plurality of air holes of the first plate and positions of inlets of the plurality of air holes of the second plate are shifted from each other in a circumferential direction.
3. The gas turbine combustor according to claim 1, wherein the multiple concentric circular air holes of the first plate are inclined from an axial direction of a combustor liner in a circumferential direction of the first plate.
4. The gas turbine combustor according to claim 1, wherein a cross-sectional area of a channel formed in the space part by partitioning by the partition wall parts is larger than or equal to a cross-sectional area of one of the plurality of air holes of the first plate.
5. The gas turbine combustor according to claim 1, comprising:
   multiple fuel headers respectively connected with multiple regions obtained by dividing the multiple concentric annular rows of the plurality of fuel nozzles in a radial direction; and
   multiple fuel systems respectively connected with the multiple fuel headers.
6. The gas turbine combustor according to claim 1, wherein an air hole of the second plate is provided with a restrictor.

7. A gas turbine comprising:
a gas turbine combustor according to claim 1;
a compressor which generates compressed air to be supplied to the gas turbine combustor; and
a turbine which is driven by combustion gas supplied from the gas turbine combustor.

8. A method for modifying a gas turbine combustor including a combustion chamber in which fuel is burned with air to generate combustion gas, a plurality of fuel nozzles arranged in multiple concentric annular rows, and a first plate arranged downstream of the plurality of fuel nozzles and having multiple concentric circular air hole rows made up of a plurality of air holes of the first plate corresponding to the plurality of fuel nozzles, comprising the steps of:

adding a second plate arranged downstream of the first plate to face the first plate and having multiple air hole rows corresponding to the multiple concentric circular air hole rows of the first plate, the multiple air hole rows of the second plate made up of a plurality of air holes of the second plate, an outlet of each of the plurality of air holes of the second plate being open to the combustion chamber; and adding partition wall parts, which are formed concentrically corresponding to the multiple concentric circular air hole rows of the first plate and the multiple air hole rows of the second plate, extend from the first plate to the second plate, and contact an opposing surface of the second plate, the partition wall parts partitioning a space part between the first and second plates into a plurality of annular internal channels corresponding to the multiple concentric circular air hole rows of the first plate.

\* \* \* \* \*